No. 764,078. PATENTED JULY 5, 1904.
C. W. STOKES.
SECTIONAL COOKER.
APPLICATION FILED AUG. 28, 1903.
NO MODEL.

Witnesses
J. Edmunds
A. Byrick

Inventor
Claire W. Stokes
By P. J. Edmunds
Attorney

No. 764,078. Patented July 5, 1904.

UNITED STATES PATENT OFFICE.

CLAIRE W. STOKES, OF PETROLEA, CANADA.

SECTIONAL COOKER.

SPECIFICATION forming part of Letters Patent No. 764,078, dated July 5, 1904.

Application filed August 28, 1903. Serial No. 171,120. (No model.)

*To all whom it may concern:*

Be it known that I, CLAIRE W. STOKES, a subject of the King of Great Britain, and a resident of the town of Petrolea, in the county of Lambton, in the Province of Ontario, Canada, have invented certain new and useful Improvements in Sectional Cookers, of which the following is a specification.

The object of this invention is to prevent the contents of a kettle or cooking utensil from boiling over on the stove or from being splashed over on the stove while being stirred or when being moved from one place to another on the stove or to prevent the contents of the cooking kettle or utensil from being splashed over on the floor when placing said cooking utensil on or removing it from the stove; and this invention consists of a drip-pan supported around the cooking kettle or utensil and of the improved construction and novel combination of parts, as will be hereinafter first fully set forth and described and then pointed out in the claim.

Figure 1:
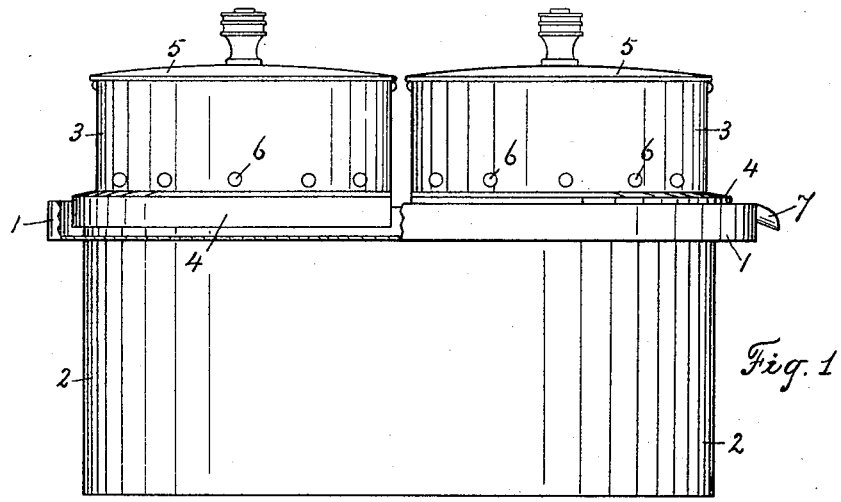
Figure 2:
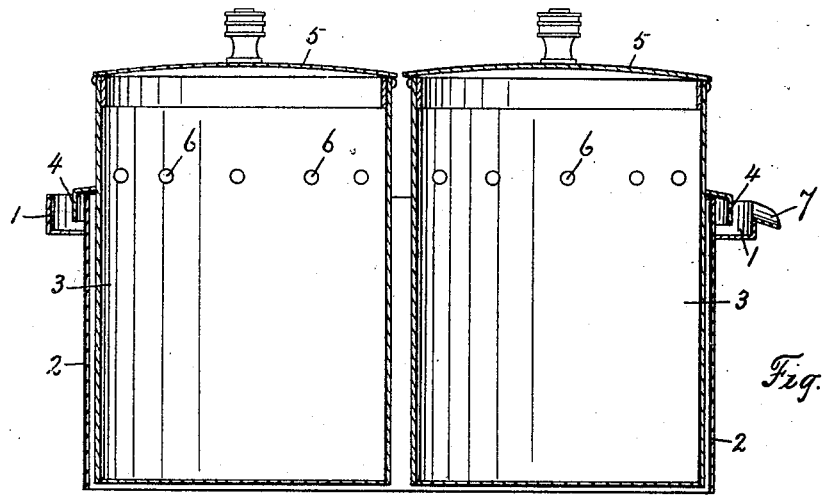
Figure 3:
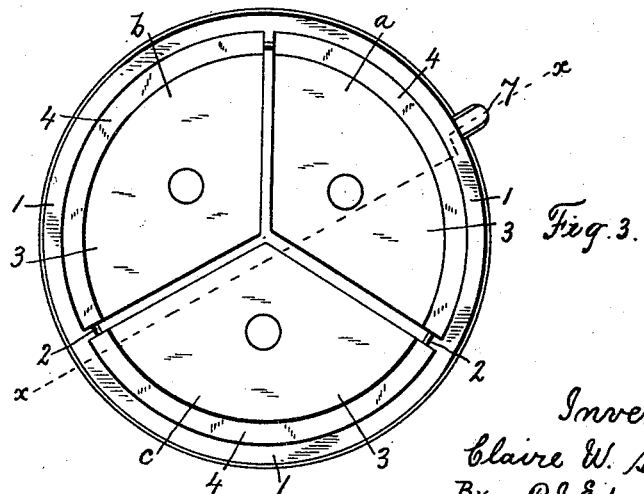

Reference being had to the accompanying drawings, Figure 1 is a side view of a cooking utensil embodying my invention. Fig. 2 is a cross-sectional view on the line $x\ x$ of Fig. 3. Fig. 3 is a plan view of Fig. 1 on a slightly-reduced scale.

In the accompanying drawings the numeral 1 designates an annular drip pan or trough, and 2 a cylinder open at both ends, on the upper end of which said drip pan or trough 1 is mounted; but said drip-pan may be made of any other shape and of any suitable material.

3 designates a cooking utensil, and, as shown in the accompanying drawings, it is formed in three separate and independent vessels or sections $a$, $b$, and $c$; but this invention would apply with equal advantage to a cooking utensil composed of one, two, or more sections or vessels or one vessel divided into one, two, or more compartments.

4 designates an overhanging flange, rib, or lip, which is secured to or it may be formed integral with said cooking vessel or utensil 3, and said overhanging flange or lip 4 is adapted to rest on the upper end of the cylinder 2 when said cooking utensil is placed in position therein, as shown in Fig. 2, and when so placed said cylinder 2 supports said cooking utensil 3.

5 designates the cover of the cooking utensil, and said cooking utensil may also be supplied with a handle to provide a convenient means for placing on or removing it from the stove or cylinder 2.

6 designates openings formed in the side of the cooking vessel or utensil 3 just above the overhanging flange or lip 4.

7 designates a spout which opens into the drip pan or trough 1 and extends from the latter to a pan or other receptacle placed adjacent thereto.

The practical advantages of this invention are that if during the process of cooking the contents of the cooking vessel or utensil should boil up to the openings 6 in the side of the cooking vessel or utensil 3 or if while stirring or moving said cooking vessel or receptacle provided with said drip pan or trough from one place to another the contents should surge or be splashed up as high as the openings 6 said contents would pass out through said openings 6, down over the overhanging flange or lip 4, and into the drip pan or trough 1, and if an excessively large quantity of the contents of the cooking vessel or utensil 3 should boil or surge into the drip pan or trough 1, more than could be held or contained in the latter when said drip-pan was about half-full, its contents would pass out of said drip-pan down the spout 7 to a pan or other receptacle placed adjacent thereto, whereas in ordinary practice when the contents of a cooking vessel boils over it boils over onto the stove and burns, the disagreeable odor from which fills the whole house, all of which is avoided and completely prevented by the use of my invention.

As a result this invention provides a very cheap, simple, and efficient construction, one by the use of which very little attention to the cooking is necessary and one in which the parts may be readily cleaned, so that while I have found by experiment that the construction herein shown and described gives the best results, at the same time, while I prefer said construction, I do not wish to limit myself to the details thereof, as they may be modified in various ways without departing from the spirit of my invention.

Having thus described my invention, I claim—

A device of the type set forth comprising a cylindrical body portion open at both ends, and a trough secured to the exterior of the cylindrical body portion at a point adjacent the upper edge, in combination with a plurality of vessels arranged in said body portion, and flanges carried by the portions of said vessels lying adjacent the wall of said body portion and extending over the upper edge thereof into said trough.

In testimony whereof I have signed in the presence of the two undersigned witnesses.

CLAIRE W. STOKES.

Witnesses:
P. J. EDMUNDS,
A. BYRICK.